(12) United States Patent
Ono

(10) Patent No.: US 6,525,786 B1
(45) Date of Patent: Feb. 25, 2003

(54) TRANSVERSE ELECTRIC LIQUID CRYSTAL DISPLAY DEVICE

(75) Inventor: Shin-ichirou Ono, Tokyo (JP)

(73) Assignee: NEC Corporation, Tokyo (JP)

( * ) Notice: Subject to any disclaimer, the term of this patent is extended or adjusted under 35 U.S.C. 154(b) by 90 days.

(21) Appl. No.: 09/711,043

(22) Filed: Nov. 13, 2000

(30) Foreign Application Priority Data

Nov. 19, 1999 (JP) .................................... 11-330632

(51) Int. Cl.[7] .................... G02F 1/1343; G02F 1/1345
(52) U.S. Cl. ........................ 349/40; 349/58; 349/141; 349/149
(58) Field of Search ................ 349/149, 150, 349/152, 141, 40, 58, 59

(56) References Cited

U.S. PATENT DOCUMENTS

| 5,739,887 A | * | 4/1998 | Ueda et al. ............ 349/149 |
| 6,191,837 B1 | * | 2/2001 | Fujimaki et al. ......... 349/141 |

FOREIGN PATENT DOCUMENTS

| JP | 04-060512 | 2/1992 |
| JP | 05-019276 | 1/1993 |
| JP | 405188388 A | * 7/1993 |
| JP | 09-026590 | 1/1997 |
| JP | 09-105918 | 4/1997 |
| JP | 9-258203 | 10/1997 |
| JP | 09-258203 | 10/1997 |
| JP | 09-269507 | 10/1997 |
| JP | 10-068935 | 3/1998 |
| JP | 11-038443 | 2/1999 |
| JP | 11-125832 | 5/1999 |
| JP | 11-149085 | 6/1999 |
| JP | 11-185991 | 7/1999 |

* cited by examiner

Primary Examiner—William L. Sikes
Assistant Examiner—Thoi V Duong
(74) Attorney, Agent, or Firm—Scully, Scott, Murphy & Presser

(57) ABSTRACT

A transverse electric liquid crystal panel is constructed as follows. A TFT-side glass substrate is bonded to a color-filter-side glass substrate so as to have a projection. The TFT-side glass substrate and the color-filter-side glass substrate are disposed in a display-surface side and a rear side respectively. The projection is so formed as to protrude horizontally therefrom over the color-filter-side glass substrate. The TFT-side glass substrate is provided with a transparent conductive film for absorbing and transmitting static electricity. The transparent conductive film is electrically connected to a ground of a circuit board arranged adjacent to the transverse electric liquid crystal panel with a conductive cable. The connection between the conductive cable and the transparent conductive film is secured with an anisotropic conductive tape. The back side of the projection is used as a pressure-contacting portion that acts as the connection between the TCP and the TFT-side glass substrate.

20 Claims, 5 Drawing Sheets

FIG. 7A - PRIOR ART
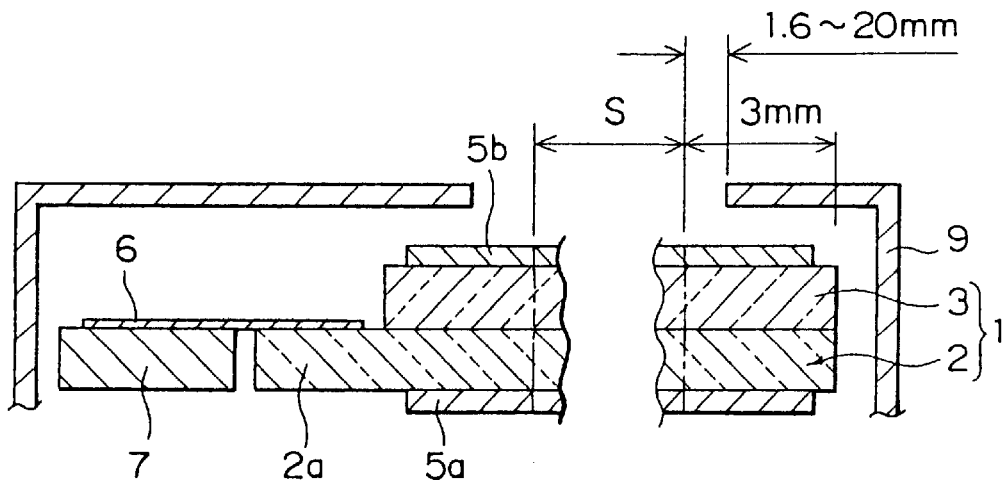
FIG. 7B - PRIOR ART
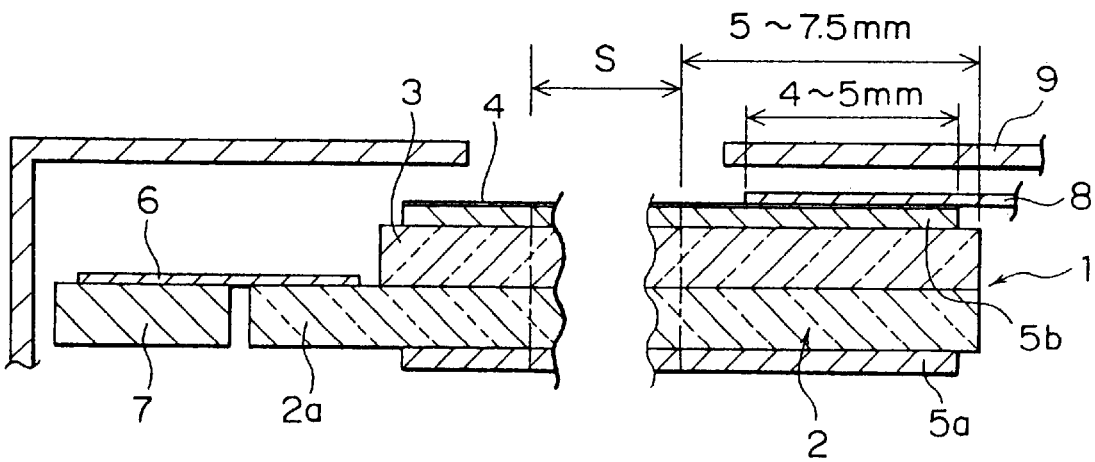
FIG. 7C
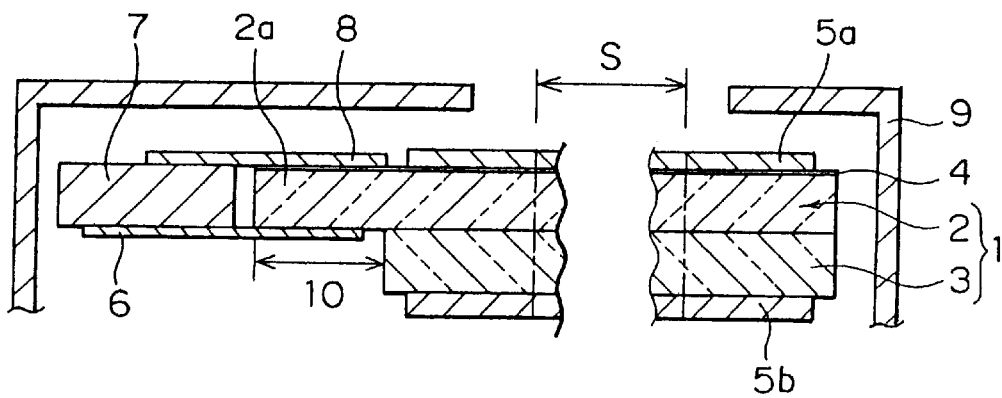

TRANSVERSE ELECTRIC LIQUID CRYSTAL DISPLAY DEVICE

BACKGROUND OF THE INVENTION

1. Field of the Invention

The present invention relates to a transverse electric liquid crystal display device, and more particularly to a transverse electric liquid crystal display device free from unevenness of display due to static electricity.

2. Description of the Related Art

In general, a liquid crystal panel is designed to have a liquid crystal material sealed in the gap between two glass substrates. A liquid crystal panel is composed of a rear-side glass substrate that has a thin-film transistor (TFT) formed on its liquid-crystal-side surface (hereafter referred to as the TFT-side glass substrate) and a glass substrate that has a color filter disposed between its surface and the liquid crystal material (hereafter referred to as the color-filter-side glass substrate). FIG. 1 is a top view and side views illustrating the structure of a conventional liquid crystal panel. As shown in FIG. 1, a conventional liquid crystal panel is composed of two glass substrates of different sizes bonded together. On the liquid-crystal-side surface of a rear-side glass substrate 30, a TFT for controlling turning ON/OFF of a liquid crystal picture element 33 is formed. By composing the liquid crystal panel of two glass substrates of different sizes, it is possible to prevent an input terminal 32 for feeding a signal to a picture element 33 from being covered by a display-surface-side glass substrate 31. Accordingly, the rear-side glass substrate 30 is made larger in size than the display-surface-side glass substrate 31 in which a color filter is disposed. In this way, the two glass substrates are bonded together so that they have a projection 34a and a projection 34b, the projections 34a and 34b being so formed as to protrude horizontally and vertically, respectively, from the TFT-side glass substrate 30 over the color-filter-side glass substrate 31. In order to feed a signal from outside to the liquid crystal panel, generally, as shown in FIG. 1, the glass substrate 30 needs to be so constructed that its two, longitudinal and lateral side edges, along which the input terminals 32 are formed, are left uncovered by the display-surface-side glass substrate 31. Even though the liquid crystal panel is specially designed, at least one side edge of the glass substrate 30 needs to be left uncovered. In the liquid crystal panel as indicated as an area 35, the two glass substrates are superimposed together at their side edges excluding those having the projections 34a or 34b.

In the liquid crystal display device, the two substrates are each provided with an electrode in order to generate an electric field therebetween. This makes it possible to control orientation of liquid crystal molecules in the liquid crystal material sealed in the gap between the two glass substrates. As a result, a display image is formed. When the direction of the electric field is assumed to be the lengthwise direction, the transverse electric liquid crystal panel has electrodes arranged in a row only along the surface of the TFT-side glass substrate. In this construction, orientation of the liquid crystal molecules is controlled by applying to the liquid crystal molecules an electric field in the transverse direction. Accordingly, in a case where static electricity is applied to the surface of the TFT-side glass substrate or the color-filter-side glass substrate and then the electrostatic charge remains on the glass surface of the substrate, an electric field is generated in the lengthwise direction. This causes the liquid crystal molecules to be oriented in a fixed direction. As a result, it is not possible to control orientation of the liquid crystal molecules properly, and this leads to unevenness of display. As will be understood from the foregoing, a transverse electric liquid crystal panel tends to suffer from degradation of display quality due to static electricity, and therefore it necessitates a means for eliminating the undesirable effects of static electricity.

Conventionally, a construction is known in which, to absorb static electricity, a transparent conductive film is formed on the surface of the display-surface-side liquid crystal panel, and this transparent conductive film is connected to the casing with a conductive spacer or the like. For example, Japanese Patent Laid-open Publication No. Hei 9-258203 proposes a liquid crystal panel of this type (a conventional example 1). FIG. 2 is a sectional view illustrating the structure of the transverse electric liquid crystal display device of the conventional example 1. As shown in FIG. 2, the transverse electric liquid crystal display device of the conventional example 1 is provided with a liquid crystal panel 101 and a circuit board 107. The liquid crystal panel 101 is located above a backlight illumination device 113 and is sandwiched between polarizing plates 105a and 105b. The circuit board 107 is arranged adjacent to the liquid crystal panel 101. The liquid crystal panel 101 is composed of a TFT-side glass substrate 102 and a color-filter-side glass substrate 103. The TFT-side glass substrate 102 is disposed on the backlight-illumination-device 113 side of the display device and has an area larger than the color-filter-side glass substrate 103. These two glass substrates are superimposed on each other so as to have a projection. The color-filter-side glass substrate 103 has a transparent conductive film 104 formed between its surface and the polarizing plate 105b that is located thereabove.

The projection provided in the liquid crystal panel 101 is built as a pressure-contacting portion 110 that acts as the connection between the TFT and a TCP (tape carrier package) 106 for driving the TFT. The TCP 106 has its one end connected to the pressure-contacting portion 110 and the other end connected to the circuit board 107. The polarizing plate 105a and the polarizing plate 105b, which are formed on the bottom surface of the TFT-side glass substrate 102 and the top surface of the color-filter-side glass substrate 103, respectively, are used to polarize the light coming from the backlight illumination device 113 that illuminates the liquid crystal panel 101 from the rear. Moreover, the display-surface-side polarizing plate 105b has an area smaller than the color-filter-side glass substrate 103. This allows the transparent conductive film 104, which is provided underneath the polarizing plate 105b, to be exposed so as to be connected to a casing 109 via a conductive spacer 112. In this way, even if the display surface is brought into contact, for example, with a user, and then the static electricity therefrom is applied to the transverse electric liquid crystal panel 101, it is possible to discharge the remaining static electricity into the casing 109.

Moreover, Japanese Laid-open Publication No. Hei 11-185991 proposes a technique to protect electronic equipment against static electricity by making use of a ground of a circuit board mounted in a liquid crystal display device (a conventional example 2). According to the conventional example 2, electronic equipment provided with a panel, for example, a liquid crystal display panel, has a transparent conductive member formed on its panel surface. In this example, by connecting this transparent conductive member to the ground of the circuit board incorporated in the electronic equipment by the use of an electric conduction means, it is possible to discharge the static electricity applied to the panel surface through the transparent conductive member via the electric conduction means into the ground of the circuit board. FIG. 3 is a sectional view illustrating the structure of the liquid crystal display device of the conventional example 2.

As shown in FIG. 3, inside a lower case 201 and an upper case 202 are arranged a main-circuit board 203, a sub-circuit board 204, and a liquid crystal panel 205. The sub-circuit board 204 and the liquid crystal panel 205 are located above the main-circuit board 203. Underneath the liquid crystal panel 205 is formed an EL (electro-luminescence) 207 built as a backlight, a shielding plate 208, and a flexible wire 209. The main-circuit board 203, disposed below the components described just above, has a plurality of electronic components 213 of different types formed on its top and bottom surfaces. The liquid crystal panel 205 is supported at its periphery by a panel holder 206. Moreover, a transparent conductive sheet 216 is stuck onto the top surface of the liquid crystal panel 205. Above the transparent conductive sheet 216 is disposed printing glass 211. A conductive sheet 217 with conductive adhesive has its one end stuck onto the top surface of the transparent conductive sheet 216 formed at the end of the liquid crystal panel 205, and the other end crimped to a ground 218 disposed on the ground-potential side of the power source of the sub-circuit board 204. The printing glass 211 has its end kept in direct contact with the upper case 202. Between the upper case 202 and the conductive sheet 217 with conductive adhesive formed on the top surface of the transparent conductive sheet 216 is disposed a compressed sponge 215. This helps establish satisfactory electrical connection among the relevant components.

However, a liquid crystal display device, like the above-described conventional example 1, that is so designed that the overlapping area between the glass substrates constituting the liquid crystal panel is used as a junction, has the following disadvantage. In this construction, the two glass substrates have a gap secured therebetween for containing a liquid crystal material. Therefore, in a case where the transparent conductive film is connected to the casing with, as a connecting means that constantly applies pressure to the liquid crystal panel, a conductive spacer or a contact piece, variation in the gap secured in the liquid display panel is unavoidable around the junction and its periphery. This leads to unevenness of display. In addition, since the casing, which is susceptible to external oscillation and shock, makes contact with the overlapping area between the two glass substrates, the external oscillation and shock applied to the casing causes the gap between the two glass substrates to vary periodically. As a result, wave-like irregularities in display occur relative to the junction between the casing and the liquid crystal panel.

Similarly, in the liquid crystal display device of the conventional example 2, connection is established by making use of the overlapping area between the two glass substrates constituting the liquid crystal panel. This causes the junction to be subjected to pressure, whereby only the part to which pressure is applied in the gap between the two glass substrates becomes narrower. As a result, the optical characteristics of the liquid crystal material sealed in the gap between the two glass substrates are disturbed, and this leads to unevenness of display.

SUMMARY OF THE INVENTION

An object of the present invention is to provide a transverse electric liquid crystal display device in which unevenness of display is satisfactorily suppressed by protecting the transverse electric liquid crystal panel against static electricity and by improving the connection reliability.

A transverse electric liquid crystal display device according to the present invention includes: a transverse electric liquid crystal panel; a circuit board arranged adjacent to the transverse electric liquid crystal panel; a semiconductor integrated circuit chip being connected to said transverse electric liquid crystal panel and said circuit board; and a casing for housing said transverse electric liquid crystal panel, said circuit board, and said semiconductor integrated circuit chip. The transverse electric liquid crystal panel comprises: a first transparent substrate; a second transparent substrate; a liquid crystal material sealed in a gap between said first transparent substrate and said second transparent substrate; a driving electrode and thin-film transistor being inputted a signal from said thin-film transistor and driving said liquid crystal material by generating electric field in a direction parallel to said first transparent substrate, said electrode and said thin-film transistor being formed on a liquid-crystal-side surface of said first transparent substrate; and a color filter disposed between said second transparent substrate and said liquid crystal material. The display-surface-side transparent substrate, of the two transparent substrates constituting the transverse electric liquid crystal panel, is bonded to the other rear-side transparent substrate so as to have a first projection. The first projection is so formed as to protrude horizontally from the display-surface-side transparent substrate over the rear-side transparent substrate. A transparent conductive film for absorbing static electricity is formed on a display-surface-side surface of the display-surface-side transparent substrate. The transparent conductive film is so formed as to extend over the first projection and being grounded by a conductive member.

In the transverse electric liquid crystal panel according to the present invention, on the surface of the display-surface-side transparent substrate is formed a transparent conductive film for absorbing the static electricity remaining on the display surface. Since this transparent conductive film is grounded, it is possible to protect the transverse electric liquid crystal panel against static electricity. Moreover, the transparent conductive film has its junction formed in the projection that is so formed as to protrude horizontally from the display-surface-side first transparent substrate. This makes it possible, before and after connection is established, to protect the gap between the first and second transparent substrates against pressure around the junction, and thus prevent unevenness of display.

Either the first transparent substrate having a driving electrode and a thin-film transistor formed therein or the color-filter-side second transparent substrate may be disposed on the display-surface side of the transverse electric liquid crystal device.

The transparent conductive film provided in the first projection may be connected to the ground of the circuit board by the conductive member.

It is possible to realize the first transparent substrate having a driving electrode and a thin-film transistor formed therein as the display-surface-side transparent substrate. In this case, it is preferable that the input terminal of the thin-film transistor formed on the back side of the first projection of the first transparent substrate be connected to the semiconductor integrated circuit chip, and that the transparent conductive film provided on the display-surface side of the first projection be connected to the ground of the circuit board by the conductive member. By doing so, it is possible to connect the transparent conductive film to the circuit board by making use of the back side of the junction between the integrated circuit chip and the first transparent substrate. This helps reduce the distance (hereinafter referred to as "the frame") between the display area of the liquid crystal display device and the very end of the components housed in the casing of the display device.

It is also possible to realize the color-filter-side second transparent substrate as the display-surface-side transparent substrate. In this case, it is preferable that the transparent conductive film provided on the display-surface side of the first projection of the second transparent substrate be connected to the ground of the circuit board with the conductive member, that the first transparent substrate be bonded to the second transparent substrate so that it has a second projection, the second projection being so formed as to protrude therefrom in a direction perpendicular to the first projection, and that the input terminal of the thin-film transistor formed on the second-transparent-substrate-side surface of the second projection of the first transparent substrate be connected to the semiconductor integrated circuit chip. By doing so, it is possible to ground the transparent conductive film by making use of an area away from the semiconductor integrated circuit chip. As a result, in a case where the semiconductor integrated circuit chip is driven into malfunction, it can be replaced with another with ease without being disturbed by the conductive member for connecting the transparent conductive film to the ground of the circuit board.

The transparent conductive film provided on the display-surface-side of the first projection may be connected to the casing by the conductive member.

The conductive member and its corresponding portion may be connected to each other with an anisotropic conductive tape.

The conductive member may be selected from the group consisting of a conductive cable, a conductive tape to which adhesive containing a conductive agent is applied, a conductive adhesive, a conductive rubber, and a contact piece.

The conductive member may be realized by the use of a conductive cable, and at least the transparent conductive film is soldered to the junction of the conductive cable by ultrasonic solder.

The nature, principle, and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 7A to 7C are sectional views of assistance in explaining the advantage of a sufficiently small-sized frame achieved in the transverse electric liquid crystal display device of the first embodiment, with FIG. 7A showing the structure of a conventional liquid crystal display device having no static-electricity prevention mechanism, FIG. 7B showing the structure of the liquid crystal display device of the conventional example 2, and FIG. 7C showing the frame portion of the liquid crystal display device of the first embodiment;

DETAILED DESCRIPTION OF THE PREFERRED EMBODIMENT

Figure 4:
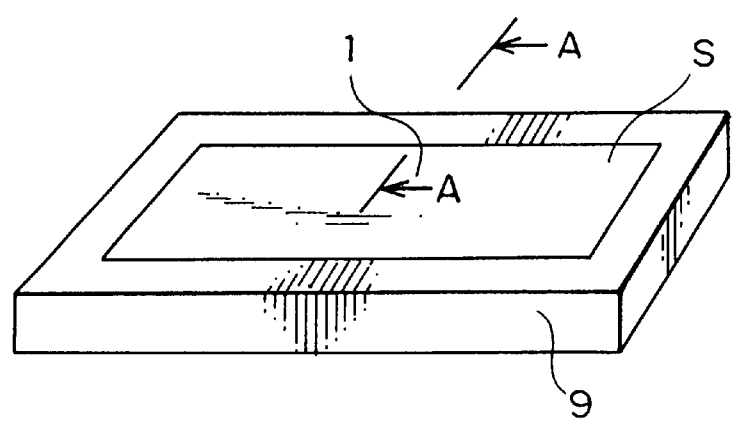
FIG. 4 is a perspective view illustrating the appearance of the transverse electric liquid crystal display device of a first embodiment of the present invention.
Figure 5:
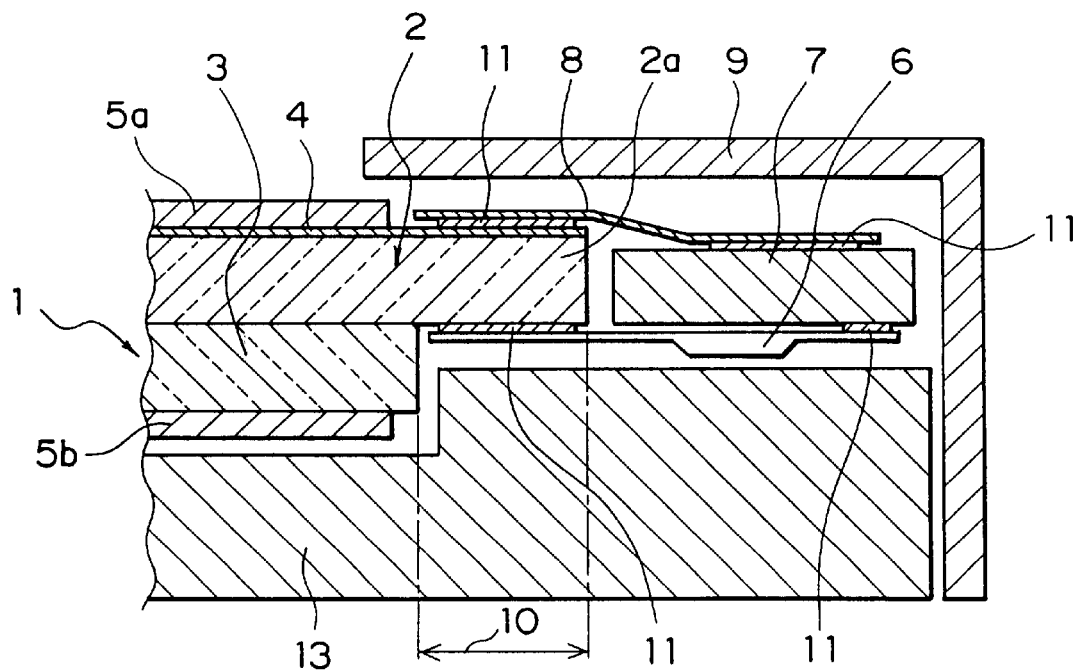
FIG. 5 is a sectional view illustrating the same shown in FIG. 4 taken along the line A—A.

Hereinafter, embodiments of the transverse electric liquid crystal display device of the present invention will be described with reference to the accompanying drawings. The transverse electric liquid crystal display device of a first embodiment of the present invention is designed to have its frame made sufficiently small-sized and to offer satisfactorily high connection liability. This is achieved by disposing the TFT-side glass substrate of the transverse electric liquid crystal panel on the display-surface side of the display device, and by discharging the static electricity applied to the transverse electric liquid crystal panel through the back side of the TCP pressure-contacting portion into the circuit board. FIG. 4 is a perspective view illustrating the appearance of the transverse electric liquid crystal display device of the first embodiment; FIG. 5 is a sectional view illustrating the same shown in FIG. 4 taken along the line A—A; and FIG. 6 is a perspective view illustrating the principal portion of the same shown in FIG. 5.

Figure 6:
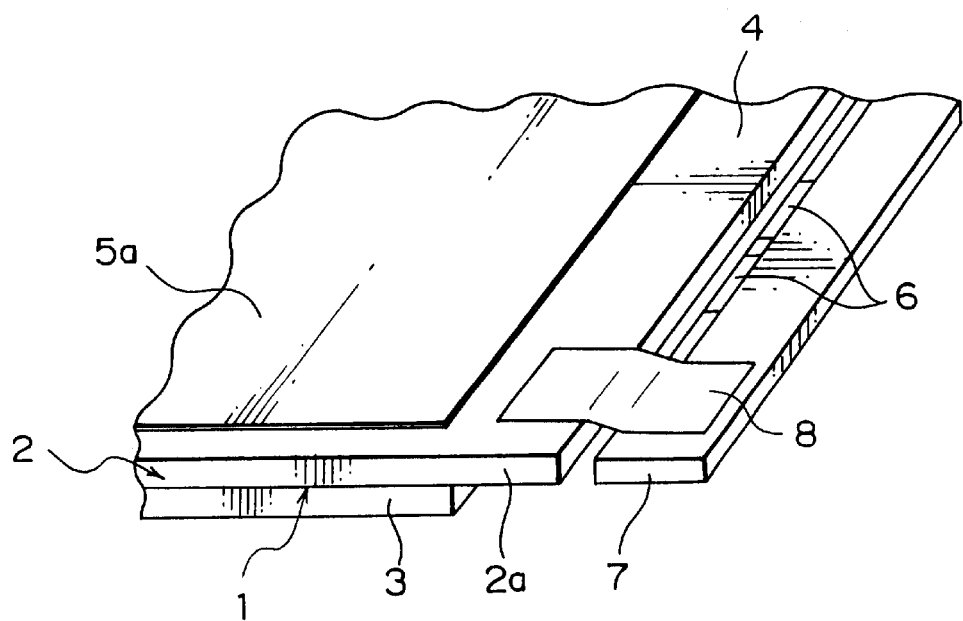
FIG. 6 is a perspective view illustrating the transverse electric liquid crystal panel and its periphery employed in the first embodiment.

As shown in FIGS. 5 and 6, the transverse electric liquid crystal display device of this embodiment is provided with a rectangular, elongated-widthwise transverse electric liquid crystal panel 1. The transverse electric liquid crystal panel 1 is composed of a color-filter-side glass substrate 3, a TFT-side glass substrate 2, and a liquid crystal material sealed in a gap secured therebetween. The color-filter-side glass substrate 3 is located above a backlight illumination device 13 and disposed on the rear side of the display device. The TFT-side glass substrate 2 is disposed on the display-surface side of the display device so as to face the color-filter-side glass substrate 3 with respect to the gap. Moreover, a circuit board 7 is arranged adjacent to the liquid crystal panel 1. In addition, as shown in FIG. 4, the other region than a display area S in the transverse electric liquid crystal panel 1 is covered by a casing 9 for protection. The backlight illumination device 13 acts as a light source for illuminating the transverse electric liquid crystal panel 1 from the rear. Image formation is achieved by exploiting the light shutter effect created by the transverse electric liquid crystal panel 1.

In an ordinary transverse electric liquid crystal panel, the color-filter-side glass substrate is realized as the display-surface-side glass substrate. By contrast, in the transverse electric liquid crystal panel 1 employed in this embodiment, the TFT-side glass substrate 2 is realized as the display-surface-side glass substrate. That is, it is to be understood that the glass substrates constituting the liquid crystal panel in this embodiment are each arranged upside down with respect to those in an ordinary liquid crystal display device. On the display-surface-side surface of the TFT-side glass substrate 2 is formed a transparent conductive film 4 for absorbing and transmitting static electricity. Note that the TFT-side glass substrate 2 is made larger in size than the color-filter-side glass substrate 3 disposed on the rear side of the display device. The TFT-side glass substrate 2 is bonded to the color-filter-side glass substrate 3 so that it has a projection 2a, the projection 2a being so formed as to protrude horizontally therefrom over the color-filter-side glass substrate 3. The projection 2a has its liquid-crystal-side surface, on which a TFT is formed, built as a pressure-contacting portion 10 that acts as the connection with a TCP 6. A transparent conductive film 4 is so formed as to extend over the projection 2a, i.e.,the back side of the pressure-contacting portion 10, of the liquid crystal panel 1. The transparent conductive film 4 is electrically connected to the ground pattern of the circuit board 7 with a conductive cable 8. The connection between the conductive cable 8 and the corresponding portions are secured with an anisotropic conductive tape (ACF) 11. In this way, the transparent conductive film 4 is grounded. Moreover, the circuit board 7 has a TCP 6 disposed on the backlight illumination device 13 side thereof. The TCP 6 has its one end connected through the pressure-contacting portion 10 to the TFT-side glass substrate 2, and the other end connected through the anisotropic conductive tape 11 to the circuit board 7. The TCP 6 and the circuit board 7 are also each disposed in the opposite region to that in which the same components are formed in an ordinary liquid crystal display device. This corresponds to the fact that the TFT-side glass substrate 2 is disposed on the display-surface side of the display device.

The anisotropic conductive tape (ACF) 11 is realized by the use of a tape made of resin blended with conductive particles and is used to connect the TCP 6 to the liquid crystal panel 1. The anisotropic conductive tape 11 is sandwiched between the TCP 6 and the input terminal of the liquid crystal panel 1. Subsequently, heat and high pressure are applied to the top surface of the TCP 6, and thereby the TCP 6 and the liquid crystal panel 1 are connected to each other. The ACF 11 is realized by the use of a thermosetting resin tape blended with conductive particles. When heat and pressure is applied thereto, by the action of the conductive particles included in the ACF 11, the TCP 6 and the input terminal are electrically connected to each other. By connecting the input terminal to the TCP 6 with the resin tape that is cured by heat, the connection is established not only electrically but also physically. Note that no pressure is applied thereto after the connection is established. In the construction of the present invention, the transparent conductive film 4, which is formed so as to extend over the projection 2a of the liquid crystal panel 1, is connected to the conductive cable 8. This helps protect the gap secured in the liquid crystal panel 1, in which a liquid crystal material is sealed, against pressure. As a result, it is possible to adopt the above-described technique in which connection is established by applying heat and pressure to the ACF 11, and thus achieve satisfactorily high connection liability.

Moreover, on the surface of the region acting as the display surface provided on the transparent conductive film 4 of the TFT-side glass substrate 2, and on its opposed position, i.e., the backlight-illumination-device 13-side surface of the color-filter-side glass substrate 3, are formed a polarizing plate 5a and a polarizing plate 5b, respectively. The polarizing plates 5a and 5b are used to polarize the light coming from the backlight illumination device 13, and are covered by the casing 9 that has an opening secured therein for the display surface.

Next, the operation of the liquid crystal display device of the embodiment under discussion will be described. In a case where, for example, the image plane is brought into contact with a user, the static electricity therefrom is applied to the transverse electric liquid crystal panel 1. The static electricity is thereafter discharged through the transparent conductive film 4 via the conductive cable 8 into the ground of the circuit board 7. Consequently, it never occurs that static electricity is accumulated on the panel surface of the transverse electric liquid crystal panel 1, and thus it is possible to prevent degradation of display quality (unevenness of display) due to static electricity.

In the transverse electric liquid crystal display device of the first embodiment, the transparent conductive film 4 provided between the display-surface-side polarizing plate 5a and the transverse electric liquid crystal panel 1 is so formed as to extend over the back side of the pressure-contacting portion 10 of the projection 2a. Moreover, the transparent conductive film 4 and the ground of the circuit board 7 are connected to each other with the electrically conductive cable 8. In this construction, when static electricity is applied to the display surface, the static electricity is absorbed by the transparent conductive film 4, and is thereafter discharged through the conductive cable 8 into the ground of the circuit board 7. This helps prevent abnormality of display.

Variation in the gap filled with a liquid crystal material between the color-filter-side glass substrate 3 and the TFT-side glass substrate 2 causes unevenness of display on the liquid crystal panel 1. Thus, in a case where, as achieved in the conventional examples, connection is established by using the overlapping area between the glass substrates constituting the liquid crystal panel based on the mechanical connecting method that requires a conductive spacer or a contact piece, it is inevitable that the liquid crystal panel is constantly subjected to pressure. This causes unevenness of display in the portion that receives pressure and its periphery on the liquid crystal panel. In the embodiment under discussion, however, the connection between the conductive cable 8 and the corresponding portions are secured with the anisotropic conductive tape 11, and therefore the liquid crystal panel is free from pressure after the connection is established. Furthermore, the back side of the pressure-contacting portion 10 serving as a junction belongs solely to the TFT-side glass substrate 2 and has no direct relation with the color-filter-side glass substrate 3. This allows, even if pressure is applied, the size of the gap between the TFT-side glass substrate 2 and the color-filter-side glass substrate 3 to be kept unchanged, and thus it is possible to prevent unevenness of display due to pressure.

Moreover, in a case where, as achieved in the conventional example 1, grounding is achieved such that the casing is connected to the transparent conductive film with a conductive spacer or a contact piece, the following problem arises. When the liquid crystal display device as a whole is handled, the casing is exposed to external oscillation and shock. Such external force may cause detachment or displacement of junctions, and this leads to increase in connection resistance. In the embodiment under discussion, however, the transparent conductive film 4 is connected to the ground of the circuit board 7. This makes it possible to bring the ground line into an enclosed state within the circuit components incorporated inside the entire device under the protection of the casing 9, thereby the ground line is protected against external influences. In addition, the conductive cable 8 is connected to a single glass portion, and thus it is possible to adopt the technique for connecting the TCP 6 to the input terminal. This significantly improves the connection liability.

Moreover, in the liquid crystal display device of this embodiment, the liquid crystal panel 1 has an upside-down substrate arrangement with respect to that of an ordinary liquid crystal panel. Specifically, the TFT-side glass substrate 2 is disposed on the display-surface side of the display device, and the color-filter-side glass substrate 3 is disposed on the rear side thereof. This allows placement of a static electricity prevention mechanism without increasing the width of the frame. Hereinafter, the advantages offered by the structure described just above will be described in more detail. FIGS. 7A to 7C are sectional views of assistance in explaining the advantage of a sufficiently small-sized frame achieved in the first embodiment, with FIG. 7A showing the structure of a conventional liquid crystal display device having no static electricity prevention mechanism, FIG. 7B showing the structure of the liquid crystal display device of the conventional example 2, and FIG. 7C showing the frame portion of the liquid crystal display device of the first embodiment.

Figure 1:
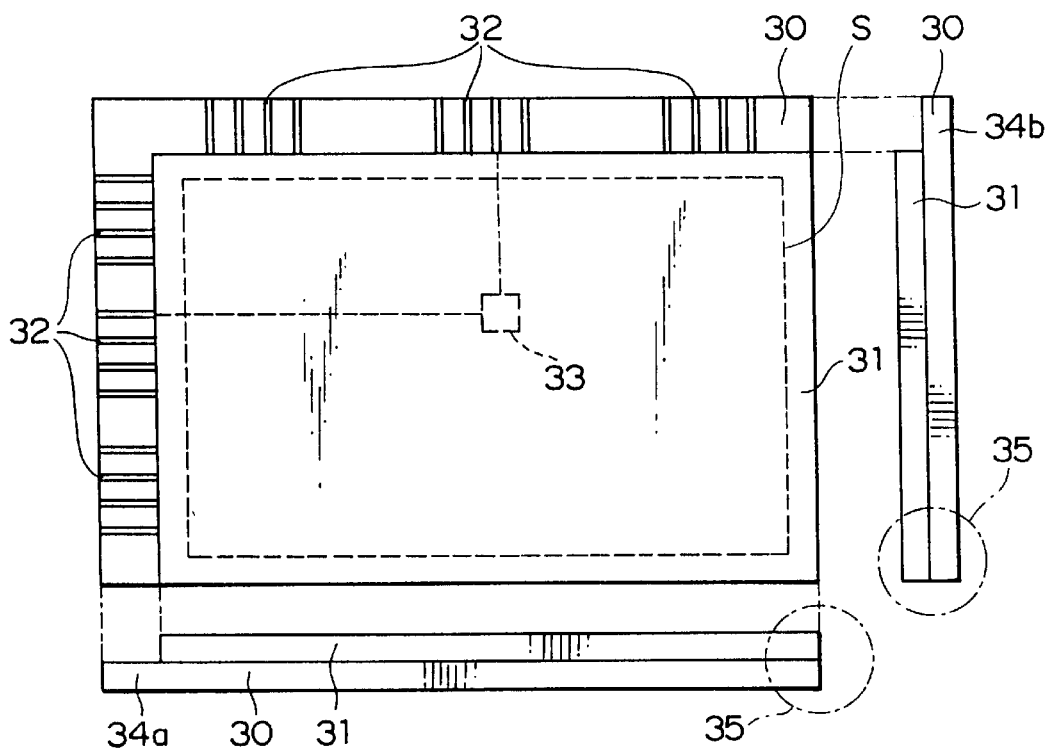
FIG. 1 is a plan view and side views illustrating the structure of a conventional liquid crystal display device.

In the above-described conventional display device with no static electricity prevention mechanism shown in FIG. 1, as shown n FIG. 7A, the distance between the display area S and the casing 9 is set at about 1.6 to 2.0 mm, and, thanks to the latest developments in a technology to achieve reduction in frame size, the distance between the display area S and the end of the components housed in the casing 9 of the display device, i.e., the width of the frame, is accordingly made as small as about 3 mm.

Figure 2:
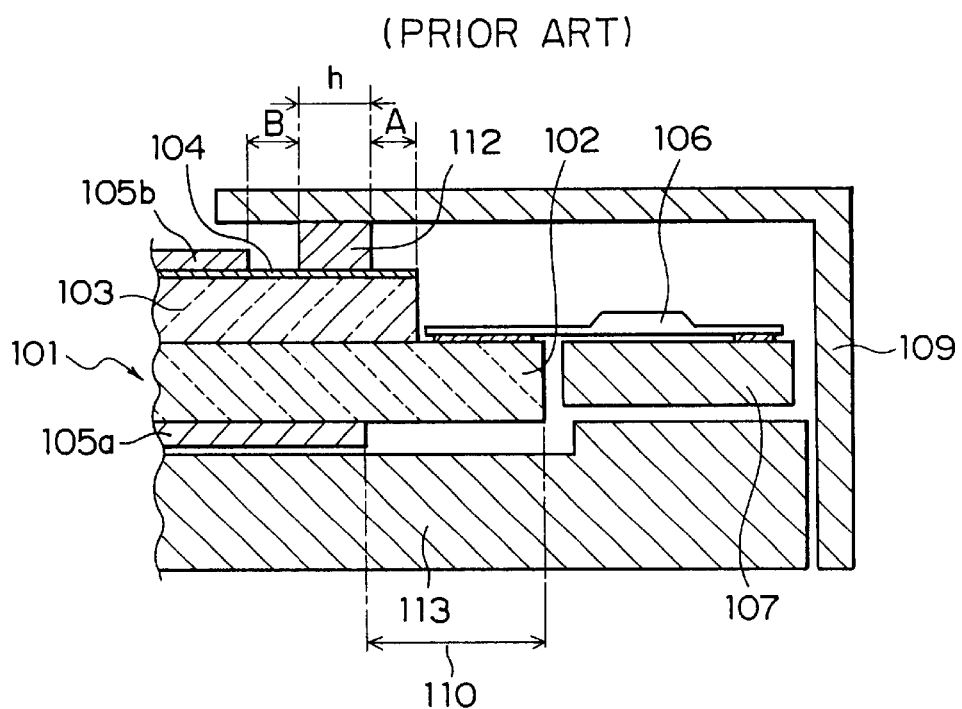
FIG. 2 is a sectional view illustrating the structure of the transverse electric liquid crystal display device of a conventional example 1.

On the other hand, in the conventional example 1 shown in FIG. 2, due to undesirable size of each component, deviation in the distances among the components, and other reasons, the liquid crystal display device needs to have an unduly large frame. For example, even in a case where, the entire display device is assembled so that the casing 109 is shifted toward the right-hand side of the outer surface of the liquid crystal panel and the transverse electric liquid crystal panel 101 is shifted maximally toward the left-hand side thereof, if the transparent conductive film 104 and the conductive spacer 112 do not make contact with each other in a region having a predetermined width, it is not possible to discharge static electricity into the casing 109 properly. In this case, the distance A between the conductive spacer 112 and the very end of the transparent conductive film 104 needs to be set at 1 to 2 mm or more (depending on the deviation amount of the distances among the components). By contrast, in a case where the entire display device is assembled so that the casing 109 is shifted toward the left-hand side of the display area of the liquid crystal panel 101 and the transverse electric liquid crystal panel 101 is shifted maximally toward the right-hand side thereof, it is necessary to prevent the conductive spacer 112 from reaching the polarizing plate 105b. To achieve this, the distance B between the conductive spacer 112 and the very end of the polarizing plate 105b needs to be set at 1 to 2 mm or more (depending on the deviation amount of the distances among the components). This requires the frame of the transverse electric liquid crystal panel 101 to be given a space having a width of h+A+B (h represents the length of the contact surface of the conductive spacer 112). As a result, it is inevitable that the transverse electric liquid crystal panel 101 has an unduly large frame.

Figure 3:
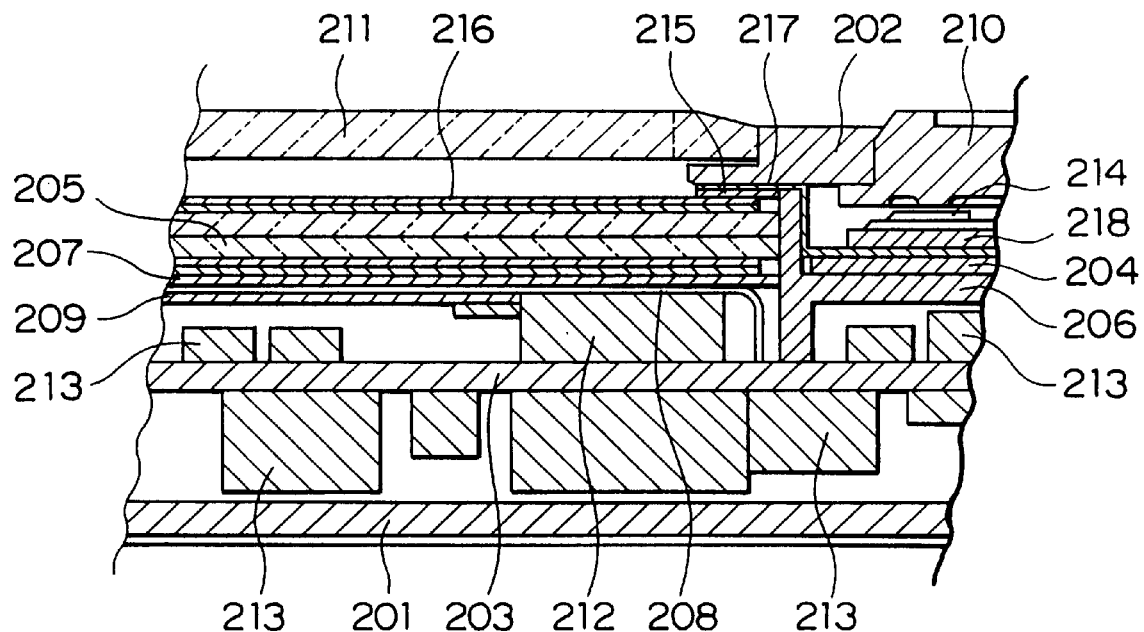
FIG. 3 is a perspective view illustrating the transverse electric liquid crystal panel and its periphery employed in a conventional example 2.

Moreover, the provision of a static electricity prevention mechanism will be considered as achieved in the conventional example 2 shown in FIG. 3. As shown in FIG. 7B, here, the color-filter-side glass substrate 3 is disposed on the display-surface side of the display device. Thus, it is necessary to use the other area than that in which the projection 2a is formed. Note that the projection 2a is so formed as to protrude horizontally from the rear-side, TFT-side glass substrate 2 over the color-filter-side glass substrate 3. This requires that connection be established by using the transparent conductive film 4, which is formed on the surface of the color-filter-side glass substrate 3 within the overlapping area between the two glass substrates, and the conductive member. As a conductive member, a conductive cable 8 is used here. In a case where the conductive cable 8 is bonded by the use of conductive adhesive, it is necessary to secure a space having a width of 4 to 5 mm for proper bonding. The reason is as follows. Since conductive adhesive is made of adhesive to which conductive particles are added, it offers relatively low adhesive strength. Thus, if a space secured for bonding is unduly small, the portions bonded together tend to be easily separated with each other due to external influences such as shock, oscillation, temperature variation, or change of properties with time. When the bonding area is assumed to have a width of 5 mm, even if the conductive cable 8 is bonded to the very end of the opening portion of the casing 9, the frame of the liquid crystal panel 1 needs to be given a width of at least 5 to 7.5 mm. This requires an unduly large frame in the entire liquid crystal display device. On the other hand, in a case where conductive rubber is used as a conductive member, if the contact surface between the conductive rubber and the transparent conductive film is made smaller than desired, the value of the contact resistance therebetween becomes unduly great. In this case, even though the conductive rubber is bonded to a position deviated from a predetermined position, or the panel and the casing are displaced with respect to each other, it is necessary to secure a contact surface having a predetermined width or above. Accordingly, the bonding area needs to be given a width of about 5 mm.

By contrast, as shown in FIG. 7C, in the embodiment under discussion, between the TFT-side glass substrate 2 constituting the liquid crystal panel 1 and the polarizing plate 5a is formed the transparent conductive film 4; the liquid crystal panel 1 has an upside-down substrate arrangement with respect to that of an ordinary liquid crystal panel; and the back side of the pressure-contacting portion 10, which is a space indispensable to a liquid crystal display device, is effectively used as a space for connection. This eliminates the need to secure extra space to achieve grounding. Thus, even if the liquid crystal display device is provided with a static electricity prevention mechanism, it is possible to keep the size of the frame equal to that of a liquid crystal display device with no static electricity prevention mechanism.

Figure 8:
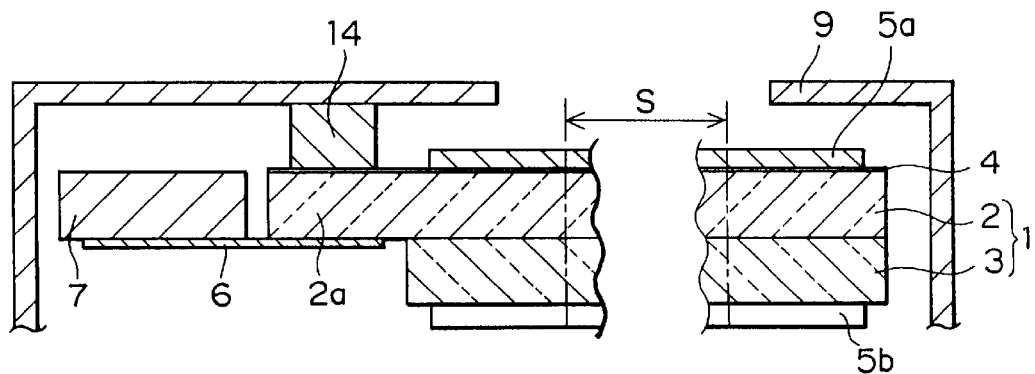
FIG. 8 is a sectional view illustrating a modified example 1 of the first embodiment of the present invention.
Figure 9:
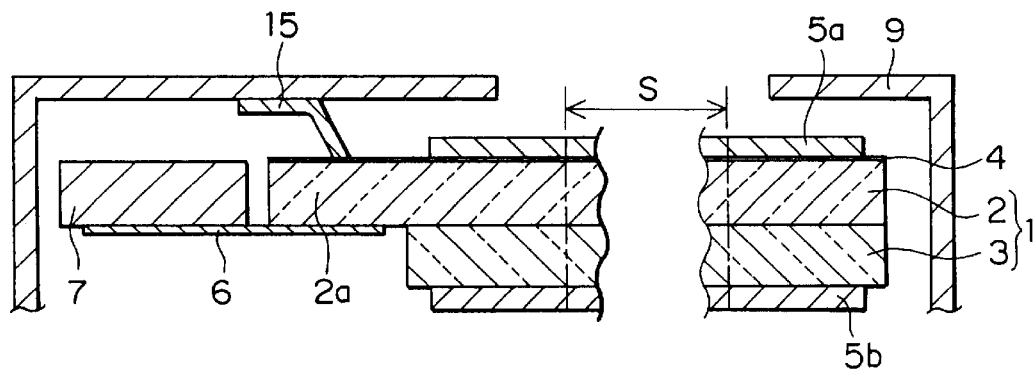
FIG. 9 is a sectional view illustrating a modified example 2 the first embodiment of the present invention.

Next, a description will be given as to the conductive member employed in the present invention. In the embodiment under discussion, the transparent conductive film 4 and the ground pattern of the circuit board 7 are electrically connected to each other with the conductive cable 8. In this case, however, instead of the conductive cable 8, it is possible to use conductive rubber, conductive contact piece, or the like. FIGS. 8 and 9 are diagrams each illustrating the principal portion of a modified example of the liquid crystal display device of the first embodiment of the present invention. More specifically, FIG. 8 is a sectional view illustrating the modified example 1 of the liquid crystal display device of the first embodiment; and FIG. 9 is a sectional view illustrating the modified example 2 of the same of the first embodiment. Note that, in the following descriptions, components that play the same or corresponding roles in the modified examples 1 and 2 shown in FIGS. 8 and 9, respectively, and the first embodiment shown in FIG. 5 will be identified with the same reference symbols and overlapping descriptions will be omitted.

As shown in FIGS. 8 and 9, the liquid crystal panel 1 has, like that of the first embodiment, its top and bottom surfaces, a polarizing plate 5a and a polarizing plate 5b, respectively. The two glass substrates constituting the liquid crystal panel 1 are each arranged upside down with respect to those constituting an ordinary liquid crystal panel. More specifically, the TFT-side glass substrate 2 and the color-filter-side glass substrate 3 are disposed on the display-surface side and the rear side of the liquid crystal display device, respectively. The TFT-side glass substrate 2 disposed on the display-surface side is bonded to the color-filter-side glass substrate 3 so that it has a projection 2a, the projection 2a being so formed as to protrude horizontally therefrom. The back side of the projection 2a serves as a pressure-contacting portion. By effective use of a space of the back side of the pressure-contacting portion that acts as the connection between the TCP 6 and the TFT-side glass substrate 2, the transparent conductive film 4 formed so as to extend over the display-surface-side projection 2a and the casing 9 are connected to each other with a conductive member.

In the modified example 1 shown in FIG. 8, as a conductive member, conductive rubber 14 is employed. Also here, the projection of the liquid crystal panel 1 is used as a junction. From this, it will be understood that the junction is realized by the use of a single glass substrate. Thus, the following advantages are obtained as compared with the conventional example 1. Even if the transparent conductive film 4 and the casing 9 are connected to each other with the conductive rubber 14, during and after the connection is established, it is possible to, around the junction, alleviate the adverse effect resulting from external influences, such as shock, on the gap containing a liquid crystal material secured in the liquid crystal panel 1. Moreover, it is also possible to secure a sufficiently wide area for connection without increasing the width of the frame. As will be understood from the foregoing, the liquid crystal display device of the modified example 1 is superior to the conventional example 1 in that reduction in the size of the frame is achieved, unevenness of display is suppressed, and the connection reliability is significantly improved.

Moreover, in the modified example 2 shown in FIG. 9, instead of the conductive rubber 14 employed in the modified example 1 shown in FIG. 8, a contact piece 15 is employed. In this case, it is possible to obtain the same effects as achieved in the modified example 1.

Moreover, a modified example 3 of the embodiment under discussion will be described hereinbelow. In this construction, instead of the conductive cable 8 employed in the first embodiment, conductive adhesive, or a conductive tape to which adhesive containing a conductive agent is applied may be used to connect the transparent conductive film 4 to the ground of the circuit board 7.

In addition, a modified example 4 of the embodiment under discussion will be described hereinbelow. In this construction, instead of the ACF 11 employed in the first embodiment, a conductive cable 8 is employed. Connection is established such that the conductive cable 8 is soldered to the transparent conductive film 4 and the ground of the circuit board 7 by the use of ultrasonic solder. The reason why ultrasonic solder is required here is that soldering the transparent conductive film 4 by the use of normal solder may lead to degradation of solderability thus to imperfect connection. However, it is possible to adopt instead normal soldering when the transparent conductive film 4 is soldered to the circuit board.

Figure 10:
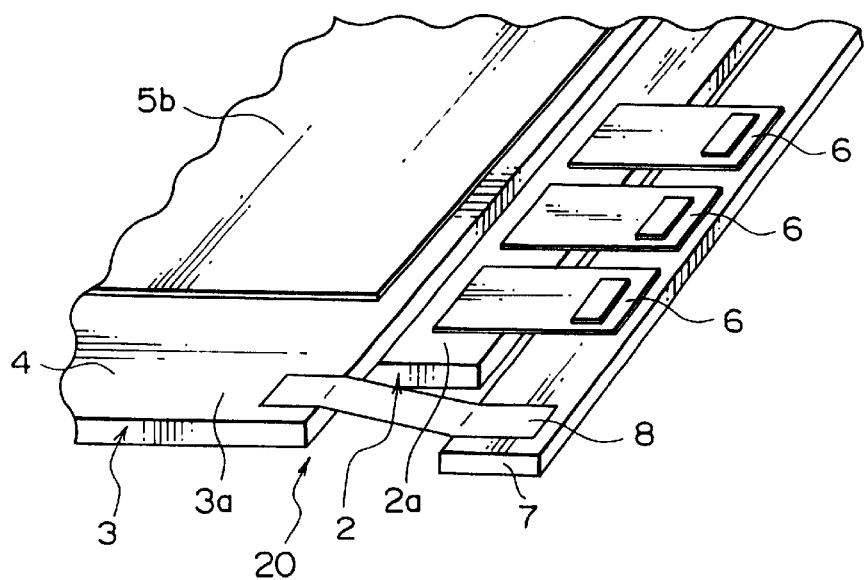
FIG. 10 is a perspective view illustrating the transverse electric liquid crystal panel and its periphery employed in a second embodiment of the present invention.

Next, the liquid crystal display device of a second embodiment of the present invention will be described. In the liquid crystal display device of the second embodiment, unevenness of display is satisfactorily suppressed by a static electricity prevention mechanism, and simultaneously, in a case where the TCP is driven into malfunction, it can be replaced with another with ease. FIG. 10 is a perspective view illustrating the transverse electric liquid crystal panel and its periphery employed in the second embodiment. Note that, in the following descriptions, components that play the same or corresponding roles in the second embodiment shown in FIG. 10 and the first embodiment shown in FIG. 5 will be identified with the same reference symbols and overlapping descriptions will be omitted.

As shown in FIG. 10, the transverse electric liquid crystal display device of the second embodiment is provided with a transverse electric liquid crystal panel 20 and a circuit board 7. The transverse electric liquid crystal panel 20 is located above a backlight illumination device (not shown in the figure). The transverse electric liquid crystal panel 20 has, like that of an ordinary liquid crystal display device, a color-filter-side glass substrate 3 disposed on the display-surface side thereof. The two glass substrates are bonded together so that they have a first projection 3a and a second projection 2a. The first projection 3a is formed in such a way that the end portion of the color-filter-side glass substrate 3 protrudes about 1 to 3 mm horizontally over the end portion of the TFT-side glass substrate 2. On the other hand, the second projection 2a is formed in such a way that the end portion of the rear-side, TFT-side glass substrate 2 protrudes over the end portion of the color-filter-side glass substrate 3 in a direction perpendicular to the first projection 3a. The second projection 2a serves as a pressure-contacting portion for feeding a signal to the TFT. The TCP 6 has its one end connected through the pressure-contacting portion to the input terminal of the TFT-side glass substrate 2, and the other end connected to the circuit board 7 that is arranged adjacent to the second projection 2a of the liquid crystal panel 20. Moreover, a transparent conductive film 4 is electrically connected to the ground circuit of the circuit board 7 with the conductive cable 8. The connection between the conductive cable 8 and the conductive film 4 is secured with an anisotropic conductive tape (not shown in the figure). The transparent conductive film 4 is so formed as to extend over the first projection 3a, which is formed in such a way that part of the color-filter-side glass substrate 3 protrudes over the TFT-side glass substrate 2. In this embodiment, the junction between the ground circuit of the circuit board 7 and the transparent conductive film 4 and the junction between one end of the TCP 6 and the circuit board 7 lie on the same plane but are located at different positions.

In this embodiment under discussion, it is impossible to enjoy the advantage of a sufficiently small-sized frame, but meanwhile it is possible to secure a junction used for connecting and grounding the transparent conductive film 4 and the circuit board 7 in a position away from the junction between the circuit board 7 and the TCP 6. By doing so, in a case where the TCP is driven into malfunction, it can be replaced with another with ease without being disturbed by the conductive cable 8. Also here, as achieved in the first embodiment, the projection 3a of the liquid crystal panel 20 is effectively used to ground the transparent conductive film 4, and in addition, it is possible to bring the ground line into an enclosed state within the circuit components incorporated inside the entire device under the protection of the casing. This makes it possible to achieve satisfactorily high connection liability and to suppress unevenness of display due to pressure.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A transverse electric liquid crystal display device comprising:

a transverse electric liquid crystal panel;

the transverse electric liquid crystal panel comprising:

a first transparent substrate;

a second transparent substrate, the display-surface-side transparent substrate, of the two transparent substrates constituting the transverse electric liquid crystal panel, being bonded to the other rear-side transparent substrate so as to have a first projection, the first projection being so formed as to protrude horizontally from the display-surface-side transparent substrate over the rear-side transparent substrate;

a liquid crystal material sealed in a gap between said first transparent substrate and said second transparent substrate;

a driving electrode and thin-film transistor being inputted a signal from said thin-film transistor and driving said liquid crystal material by generating electric field in a direction parallel to said first transparent substrate, said electrode and said thin-film transistor being formed on a liquid-crystal-side surface of said first transparent substrate;

a color filter disposed between said second transparent substrate and said liquid crystal material; and a transparent conductive film for absorbing static electricity, formed on a display-surface-side surface of the display-surface-side transparent substrate, the transparent conductive film being so formed as to extend over the first projection and being grounded by a conductive member, a circuit board arranged adjacent to the transverse electric liquid crystal panel;

a semiconductor integrated circuit chip being connected to said transverse electric liquid crystal panel and said circuit board; and a casing for housing said transverse electric liquid crystal panel, said circuit board, and said semiconductor integrated circuit chip.

2. The transverse electric liquid crystal display device according to claim 1, wherein said first transparent substrate having said driving electrode and said thin-film transistor formed therein is realized as a display-surface-side transparent substrate.

3. The transverse electric liquid crystal display device according to claim 1, wherein said second transparent substrate disposed on the color-filter side of the display device is realized as a display-surface-side transparent substrate.

4. The transverse electric liquid crystal display device according to claim 1, wherein said transparent conductive film provided in said first projection is connected to a ground of said circuit board by said conductive member.

5. The transverse electric liquid crystal display device according to claim 1, wherein said transparent conductive film provided on the display-surface side of said first projection is connected to said casing by said conductive member.

6. The transverse electric liquid crystal display device according to claim 1, wherein said conductive member and its corresponding portion are connected to each other with an anisotropic conductive tape.

7. The transverse electric liquid crystal display device according to claim 1, wherein said conductive member is selected from the group consisting of a conductive cable, a conductive tape to which adhesive containing a conductive agent is applied, a conductive adhesive, a conductive rubber, and a contact piece.

8. The transverse electric liquid crystal display device according to claim 1, wherein said conductive member is realized by use of a conductive cable, and at least said transparent conductive film is soldered to a junction of the conductive cable by use of ultrasonic solder.

9. The transverse electric liquid crystal display device according to claim 2, wherein an input terminal of said thin-film transistor formed on a back side of said first projection of said first transparent substrate is connected to said semiconductor integrated circuit chip, and wherein said transparent conductive film provided on the display-surface side of said first projection is connected to a ground of said circuit board by said conductive member.

10. The transverse electric liquid crystal display device according to claim 2, wherein said transparent conductive film provided in said first projection is connected to a ground of said circuit board by said conductive member.

11. The transverse electric liquid crystal display device according to claim 2, wherein said transparent conductive film provided on the display-surface side of said first projection is connected to said casing by said conductive member.

12. The transverse electric liquid crystal display device according to claim 2, wherein said conductive member and its corresponding portion are connected to each other with an anisotropic conductive tape.

13. The transverse electric liquid crystal display device according to claim 2, wherein said conductive member is selected from the group consisting of a conductive cable, a conductive tape to which adhesive containing a conductive agent is applied, a conductive adhesive, a conductive rubber, and a contact piece.

14. The transverse electric liquid crystal display device according to claim 2, wherein said conductive member is realized by use of a conductive cable, and at least said transparent conductive film is soldered to a junction of the conductive cable by use of ultrasonic solder.

15. The transverse electric liquid crystal display device according to claim 3, wherein said transparent conductive film provided on the display-surface side of said first projection of said second transparent substrate is connected to a ground of said circuit board by said conductive member, wherein said first transparent substrate is bonded to said second transparent substrate so as to have a second projection, said second projection being so formed as to protrude therefrom in a direction perpendicular to said first projection, and wherein an input terminal of said thin-film transistor formed on the second-transparent-substrate-side surface of said second projection of said first transparent substrate is connected to said semiconductor integrated circuit chip.

16. The transverse electric liquid crystal display device according to claim 3, wherein said transparent conductive film provided in said first projection is connected to a ground of said circuit board by said conductive member.

17. The transverse electric liquid crystal display device according to claim 3, wherein said transparent conductive film provided on the display-surface side of said first projection is connected to said casing by said conductive member.

18. The transverse electric liquid crystal display device according to claim 3, wherein said conductive member and its corresponding portion are connected to each other with an anisotropic conductive tape.

19. The transverse electric liquid crystal display device according to claim 3, wherein said conductive member is selected from the group consisting of a conductive cable, a conductive tape to which adhesive containing a conductive agent is applied, a conductive adhesive, a conductive rubber, and a contact piece.

20. The transverse electric liquid crystal display device according to claim 3, wherein said conductive member is realized by use of a conductive cable, and at least said transparent conductive film is soldered to a junction of the conductive cable by use of ultrasonic solder.

\* \* \* \* \*